A. F. HAWKSLEY.
WHEEL FOR MOTOR CARS AND OTHER VEHICLES.
APPLICATION FILED APR. 14, 1911.

1,072,226.

Patented Sept. 2, 1913.

2 SHEETS—SHEET 2.

WITNESSES

INVENTOR
Arthur F. Hawksley
By
James L. Norris Jr.
Atty

UNITED STATES PATENT OFFICE.

ARTHUR FREDK. HAWKSLEY, OF FAIRHAVEN, ENGLAND.

WHEEL FOR MOTOR-CARS AND OTHER VEHICLES.

1,072,226.  Specification of Letters Patent.  Patented Sept. 2, 1913.

Application filed April 14, 1911. Serial No. 621,059.

*To all whom it may concern:*

Be it known that I, ARTHUR FREDERICK HAWKSLEY, a British subject, residing at Fairhaven, county of Lancaster, England, have invented certain new and useful Improvements in Wheels for Motor-Cars and other Vehicles, of which the following is a specification.

This invention relates to pneumatic wheels in which three or more pneumatic cushions are inserted in or applied to the body of the wheel near or adjacent to the periphery, each of such cushions comprising a pneumatic tube with a cover on both sides clamped to the wheel body. The covers for these cushions have generally been made by winding a suitable cord backward and forward, radially or otherwise, between rings or stiffened edges arranged at the inner opening and outer periphery of the cover, and have subsequently been placed in a vulcanizing press with a suitable quantity of rubber, and vulcanized to form a solid sheet. I have found, however, that there is a tendency for these cushion covers, after being in use for some time, to split between the different cords, and this invention is designed to overcome this defect.

This invention consists essentially in combining with the radial cords of the cushion, a second cord laid spirally, annularly, or otherwise across the radial cords and in a plane at approximately right angles thereto, to prevent the cushion splitting, the whole being subsequently vulcanized with rubber in the ordinary way to form the complete cushion cover.

The invention will be fully described with reference to the accompanying drawings.

Figure 1:
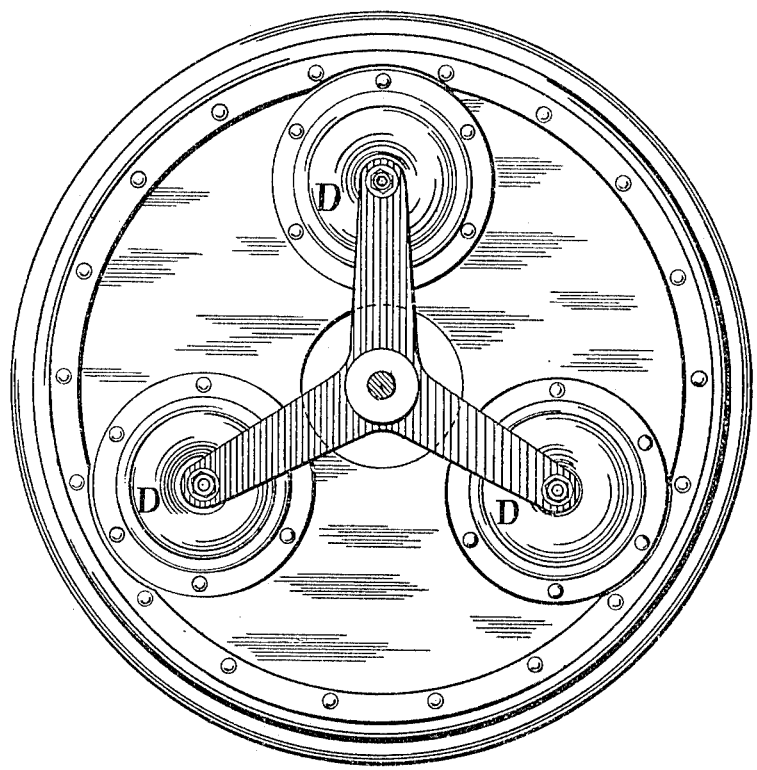
Figure 7:
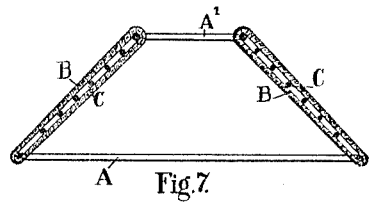
Figure 4:
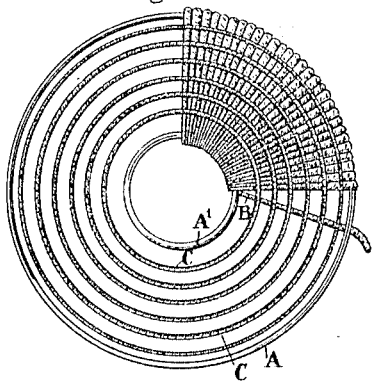
Figure 6:
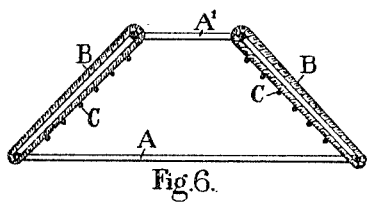
Figure 5:
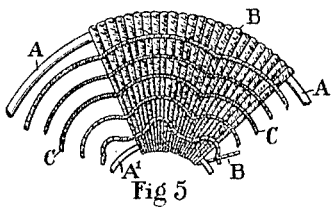
Figure 8:
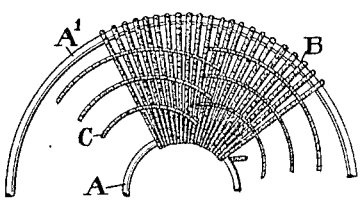
Figure 2:
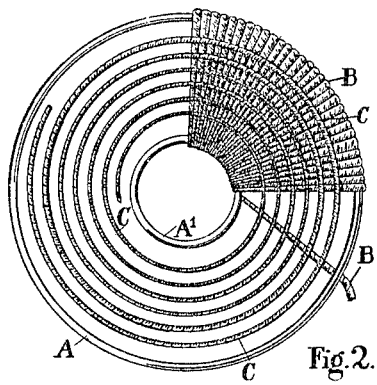
Figure 3:
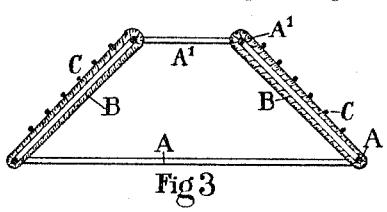

Figure 1. is a side elevation showing the type of wheel with pneumatic cushions to which the invention is applied. Fig. 2. is a side elevation of a partially constructed cushion cover showing the position of the radial cords and the cross cords, the latter being spirally arranged. Fig. 3. is a section of the same before being shaped and vulcanized. Fig. 4. is a side elevation of a partially constructed cushion showing the position of the radial cords and the cross cords, the latter having an annular arrangement. Fig. 5. is a similar elevation showing the cross cords as having an undulating arrangement. Figs. 6 and 7. are sections similar to Fig. 3 but showing modifications. Fig. 8. is a side elevation of a partially constructed cushion cover showing the position of the radial cords, the cross cords being in short lengths.

The two rings A A' may be of metal or other suitable material, the ring A of a diameter equal to the outer edge of the cushion, and the ring A' of a diameter equal to the central opening or inner edge of the cushion. Over these rings a cord B is wound backward and forward, preferably radially, (or at an angle to the radius of the outer ring A). The cord B is preferably wider on one surface than the other, that is,—flat or oval in cross section,—and is laid flat on the outer ring A, and on its edge on the inner ring A' in order to fully close up the intervening spaces as in Figs. 2 to 4 and 5. The cord B may however be an ordinary round cord as in Fig. 8. The cords B are coated or saturated or impregnated with rubber, and a layer or coating of rubber is laid over them when in position. Over the surface formed by the cords B a second cord C is laid, preferably in a spiral, each coil being a suitable distance from the next as in Fig. 2, or in a series of annular rings as in Fig. 4, or in an undulating spiral or rings as in Fig. 5, or in short sectional lengths as in Fig. 8. The cord C may be flat, round, oval or other suitable shape. The cord C is preferably laid on the outside surface of the cover, as indicated in Fig. 3, though it may be laid on the inside surface as indicated in Fig. 6, or inserted between the cords B as indicated in Fig. 7. Over the cords so arranged a layer or sheet of rubber is laid. The cover so formed is placed in a vulcanizing mold and molded and vulcanized to the desired shape in the ordinary way. The cord C thus applied across the cords B binds the latter together and, while allowing a certain freedom of movement of the cords B, prevents the cover splitting by preventing the cords B opening out or spreading laterally too far when in wear.

What I claim as my invention and desire to protect by Letters Patent is:—

1. A cover for vehicle wheel cushions comprising a pair of co-axial rings, a cord looped radially backward and forward across and around said rings, and a cord laid across the radial loops of the first-named cord to prevent the cover from splitting.

2. A cover for vehicle wheel cushions comprising a pair of co-axial rings, a cord looped radially backward and forward across and around said rings, and a cord laid approximately at right angles across the radial loops of the first-named cord to prevent the cover from splitting.

3. A cover for vehicle wheel cushions comprising a pair of co-axial rings, a cord wider in one direction than in the other looped radially backward and forward across and around said rings, said cord being laid flat on the outer ring and edgewise on the inner ring, and a cord laid across the radial loops of the first named cord to prevent the cover from splitting.

4. A cover for vehicle wheel cushions comprising a pair of co-axial rings, a cord wider in one direction than in the other looped radially backward and forward across and around said rings, said cord being laid flat on one ring and edgewise on the other ring, and a cord laid spirally across the radial loops of the first-named cord to prevent the cover from splitting.

5. A cover for vehicle wheel cushions comprising a pair of co-axial rings arranged in spaced parallel planes, one of said rings having a diameter less than that of the other ring, a cord wider in one direction than in the other looped radially backward and forward across and around said rings, said cord being laid flat on the second-named ring and edgewise on the first-named ring, and a cord laid across the radial loops of the first-named cord to prevent the cover from splitting.

6. A cover for vehicle wheel cushions comprising a pair of co-axial rings arranged in spaced parallel planes, one of said rings having a diameter less than that of the other ring, a cord looped radially backward and forward across and around said rings, and a cord laid across the radial loops of the first-named cord to prevent the cover from splitting.

In testimony whereof I have hereunto set my hand in presence of two subscribing witnesses.

A. FREDK. HAWKSLEY.

Witnesses:
J. OWDEN O'BRIEN,
HARRY BARNFATHER.

---

Copies of this patent may be obtained for five cents each, by addressing the "Commissioner of Patents, Washington, D. C."